United States Patent [19]

Darsow et al.

[11] 3,960,815

[45] June 1, 1976

[54] BRANCHED AROMATIC POLYARYL-ETHER SULPHONES

[75] Inventors: Gerhard Darsow; Paul Schiller, both of Krefeld-Urdingen; Eckart Reese, Dormagen; Ludwig Bottenbruch, Krefeld-Bockum; Rudolph Binsack; Hugo Vernaleken, both of Krefeld; Joachim Wank, Zons, all of Germany

[73] Assignee: Bayer Aktiengesellschaft, Leverkusen, Germany

[22] Filed: Jan. 29, 1974

[21] Appl. No.: 437,643

[30] Foreign Application Priority Data
Feb. 3, 1973 Germany............................ 2305413

[52] U.S. Cl............................. 260/49; 260/33.6 R; 260/33.8 R
[51] Int. Cl.$^2$........................................ C08G 75/23
[58] Field of Search........................................ 260/49

[56] References Cited
UNITED STATES PATENTS

| | | |
|---|---|---|
| 3,554,972 | 1/1971 | Cornell ................................ 260/49 |
| 3,579,475 | 5/1971 | Jones et al. ........................... 260/49 |
| 3,634,354 | 1/1972 | Darsow et al. ........................ 260/49 |
| 3,647,751 | 3/1972 | Darsow et al. ........................ 260/49 |
| 3,772,248 | 11/1973 | Brown et al. .......................... 260/49 |

*Primary Examiner*—Donald E. Czaja
*Assistant Examiner*—H. H. Fletcher
*Attorney, Agent, or Firm*—Connolly and Hutz

[57] ABSTRACT

A branched, high molecular-weight polyaryl-ether sulphone which is the reaction product of approximately equimolar amounts of an aromatic dialkali metal bishydroxylate and a bis-(halogen-aryl) compound, whose aryl nuclei are linked by sulphonyl groups, and about 0.01 to about 2 mol %, based on the bishydroxylate or bis-(4-halogenaryl) compound, of an aromatic compound having at least three aromatically linked alkali metal hydroxylate substitutents and/or of a halogenaryl compound having at least three aryl-linked halogen substituents and which is capable of substitution under the reaction conditions of polyaryl-ether sulphone manufacture.

6 Claims, No Drawings

BRANCHED AROMATIC POLYARYL-ETHER SULPHONES

BACKGROUND OF THE INVENTION

The subject matter of the invention relates to branched, high-molecular, soluble, thermoplastic, aromatic polyaryl-ether sulphones, obtained by the reaction in polar organic solvents of aromatic dialkali metal bishydroxylates (dialkali metal bisphenolates) with bis-(4-halogenaryl) compounds, whose aryl nuclei are linked by sulphonyl groups, and with three or more than three functional aromatic alkali metal hydroxylates and/or such halogen-aryl compounds, which have three or more aryl-linked halogen substituents capable of substitution under the reaction conditions prevailing in the manufacture of polyaryl ether sulphones.

Films and moldings from these branched polyaryl-ether sulphones, in contrast to those from linear polyaryl-ether sulphones, surprisingly show improved resistance to unsaturated polyester resins, reduced inflammability and little susceptibility to stress cracking.

Linear polyaryl-ether sulphones, for example, which are obtained in accordance with Dutch patent application No. 6 408 130, fail to be of use as electro-insulating foils because of their low resistance to solvents and, in particular, to unsaturated polyester resins when the insulated parts are cast with them (H. Glaser, Kunststoffe Issue No. 4, (1971), p. 234, and J. Buhlmann industrie-elektrik + elektronik no. 20 (1972) p. 514).

The branched aromatic polyaryl-ether sulphones according to the invention do not exhibit these disadvantages.

SUMMARY OF THE INVENTION

The novel polyaryl-ether sulphones according to the invention are prepared by reacting with one another approximately equimolecular amounts of at least one aromatic dialkali metal bis-hydroxylate and at least one bis-(4-halogenaryl)-compound, whose aryl nuclei are linked by at least one sulphonyl groups, with the use of about 0.01 mol % to about 2 mol %, preferably about 0.05 mol % to about 1.5 mol % (based on the bishydroxylate or on the bishalogenaryl compound), of an alkali metal salt of an aromatic compound containing three or more than three hydroxyl groups and/or an halogenaryl compound having three or more than three aryllinked halogen substituents capable of substitution under the reaction conditions prevailing in the manufacture of polyarylether sulphones.

In the manufacture of branched aromatic polyaryl-ether sulphones there may for example be used a $C_1$–$C_4$ monoalkyl halogenide and/or a monophenol as chain breaking agents in amounts of 0.001 to approximately 5 mol %, based on the bishydroxylate or bishalogenaryl compound.

The extent to which the polyaryl ether sulphones of the invention branch is naturally dependent on the amount and type of the branching agent used, that is on the specific aromatic compound containing three or more than three hydroxyl groups and/or the specific halogen aromatic compound containing three or more than three halogen substituents capable of substitution under the conditions of the polyaryl-ether sulphone manufacture.

According to the invention high-molecular, thermoplastic polyaryl-ether sulphones are produced which are still completely soluble in the conventional solvents and whose relative viscosities, measured in solutions of 0.5 g of product in 100 ml of methylene chloride at 25°C, lie between about 1.15 and about 1.80 and whose mean molecular weights, measured by means of light diffusion, lie between about 20,000 and about 120,000.

DETAILED DESCRIPTION OF THE INVENTION

Suitable bis-(4-halogenaryl) compounds, whose aryl nuclei are linked by at least one sulphone groups, are for example those of the general formula I

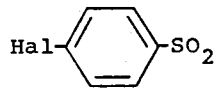 (I)

where
$n = 0$ or 1,
Hal is chlorine or fluorine, and
$Ar^1$ is a bisphenylene radical or an oxybiphenylene radical.

These compounds are known from the literature and include monosulphones, such as 4,4'-dichlorodiphenyl sulphone or 4,4'-difluorodiphenyl sulphone ($n = 0$ in formula I) and dihalogen-diaryl-disulphone of general formula I when $n = 1$.

Suitable bisphenols for the preparation of the named aromatic dialkali metal bishydroxylates (dialkali metal bisphenolates) are mononuclear bisphenols, such as hydroquinone or resorcin, but preferably compounds of the general formula II

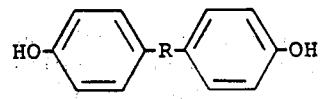 (II)

where
R is a bivalent $C_1$–$C_{12}$ alkylene or alkylidine radical, a $C_3$–$C_{12}$ cycloalkylene or cycloalkylidene radical, a $C_7$–$C_{12}$ aralkylene or aralkylidene radical or a $C_8$–$C_{12}$ arylene bisalkylidene radical or one of the members of the group —O—, —S—, —SO—, —SO$_2$—, —CO— or a simple bond.

Suitable bisphenols include, for example, bis-(4-hydroxyphenyl)-methane, 1,1-bis-(4-hydroxyphenyl)-cyclohexane, bis-(4-hydroxyphenyl)-phenyl methane, 4,4'-dihydroxy-diphenyl ether, -sulphide, -sulphoxide, -benzophenone, and in particular, 2,2-bis-(4-hydroxyphenyl)-propane, 4,4'-dihydroxydiphenyl-sulphone, 4,4'-dihydroxydiphenyl and α,α'-bis-(4-hydroxyphenyl)-p-diisopropyl benzene. Apart from the hydroxyl groups the aromatic radical may have additional substituents, such as, for example, alkyl substituents, providing that large-sized substituents in the neighboring position with respect to the hydroxyl groups do not adversely affect their reactivity through steric or any other hindrance. A suitable bisphenol of this kind is 2,2-bis-(3-methyl-4-hydroxyphenyl)-propane.

As branching components of the type of aromatic compound containing three or more than three hydroxyl groups for the preparation of the polyaryl-ether sulphones of the invention there may be mentioned: phloroglucin, 4,6-dimethyl-2,4,6-tri-(4-hydroxyphenyl)-heptene-2 (trimeric isopropenylphenol), 4,6-dimethyl-2,4,6-(4-hydroxyphenyl)-heptane (hydrogenated trimeric isopropenyl phenol), 1,3,5-tri-(4-hydroxyphenyl)-benzene, 1,1,1-tri-(4-hydroxyphenyl)-ethane and propane, tetra-(4-hydroxyphenyl)-methane, 1,4-bis-[(4', 4''-dihydroxytriphenyl)-methyl]-benzene and 2,2-bis-[4,4'-bis-(4-hydroxyphenyl)-cyclohexyl]-propane. Trivalent or more than trivalent phenols which can be prepared by the reaction of p-alkylsubstituted monophenols having unsubstituted o-positions with formaldehyde or formaldehyde-yielding compounds are particularly suitable, such as, for example, the trisphenol from p-cresol and formaldehyde — the 2,6-bis-(2'-hydroxy-5'-methylbenzyl)-4-methylphenol. Other examples of the suitable aromatic compounds include 2,6-bis-(2'-hydroxy-5'-isopropyl-benzyl)-4-isopropenyl-phenol and bis-[2-hydroxy-3-(2'-hydroxy-5'-methylbenzyl-5-methylphenyl]-methane.

Other trivalent or more than trivalent phenols which are suitable and which have halogen atoms in addition to the phenolic hydroxyl groups, are, for example, the halogen-containing trihydroxyaryl ethers of the formula III

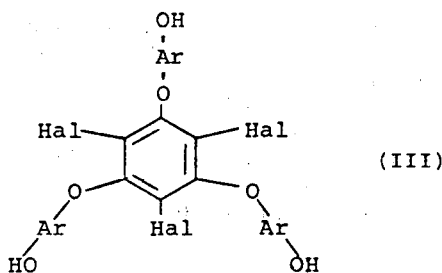

(III)

wherein Ar represents a mononuclear or polynuclear, bivalent, aromatic radical and Hal is chlorine or bromine. Examples of such compounds are: 1,3,5-tris-(4-hydroxy-phenoxy)-2,4,6-trichlorobenzene, 1,3,5-tris-[4-(4-hydroxy-phenyl-isopropyl)-phenoxy]-2,4,6-trichlorobenzene, 1,3,5-tris-[4-(4-hydroxy)-biphenoxy]-2,4,6-trichlorobenzene, 1,3,5-tris-[4-(4-hydroxyphenylsulphonyl)-phenoxy]-2,4,6-trichlorobenzene and 1,3,5-tris-[4-(4-hydroxyphenyl-isopropyl)phenoxy]-2,4,6-tribromobenzene, the preparation of which is described in the German OS No. 1 768 620. An exact explanation of the symbol Ar is likewise given there (p. 3 of the German OS No. 1 768 620).

Halogenaryl compounds which are suitable as branching components for the polyaryl-ether sulphones of the invention and which have three or more than three aryl-linked halogen substituents and which can be substituted under the reaction conditions of polyaryl-ether sulphone preparation include halogenaryl compounds whose halogen substituents are activated by electron-attracting groups: there may be mentioned, for example, 1,3,5-tri-(4-chlorophenyl-sulphonyl)-benzene, 2,4,4'-trichlorodiphenyl sulphone, 1-chloro-2,6-bis-(4-chlorophenyl-sulphonyl)-benzene. The activation of the halogen substituents can be accomplished by the sulphonyl group as well as by other electron-attracting groups, viz, those with a positive sigma value.

(Cf. Chem. Rev. 49 (1951) p. 273 et seq. and Quart. Rev. 12 (1958) 1 et seq.): preferred are substituents whose sigma values are greater than + 1.

Not only the sulphone groups but also, for example, the carbonyl or the nitro group or the cyano group are suitable as electron-attracting groups for the activation of the halogen atoms in the halogenaryl compounds which carry three or more than three halogen substituents and which are suitable for branching the aromatic polyaryl-ether sulphones.

Additional bishydroxy compounds suitable for the synthesis of polyaryl-ether sulphones are named in the German OS No. 1 545 106 and U.S. Pat. No. 3,647,751; other bis-(4-halogenaryl) compounds whose aryl radicals are linked by at least one sulphonyl group are named, for example, in the U.S. Pat. No. 3,647,751.

Examples of alkali metal hydroxylates derived from the aromatic compounds containing two, three or more than three hydroxyl groups are the corresponding sodium hydroxylates and potassium hydroxylates.

The reaction conditions employed are those generally known in the art for the manufacture of polyaryl-ether sulphones. As suitable polar organic solvents there may be mentioned for example diethyl sulphoxide, dimethyl sulphone, diethyl sulphone, diisopropyl sulphone and tetramethyl sulphone, but in particular dimethyl sulphoxide. They are used in amounts of about 1 to 5 liters, based on 1 mol of the dialkali metal bishydroxylate used.

To carry out the process the alkali metal salts of the aromatic bishydroxy compounds and the alkali metal salts of the aromatic hydroxy compounds with three and/or of the aromatic hydroxy compounds with more than three hydroxyl groups are introduced into one of the named polar solvents together with dihalogenaryl sulphone in an amount equimolecular to the alkali metal salts of the aromatic bishydroxy compounds, and the mixture is reacted at temperatures between 100° and 160°C to form high molecular polyaryl-ether sulphone while splitting off alkali metal chloride. The procedure corresponds to the above when employing halogenaryl compounds with three and/or more than three aryl-linked halogen substituents capable of substitution under the reaction conditions of the polyaryl-ether sulphone preparation, be it instead of or together with the alkali metal salts of the aromatic hydroxy compounds with three and/or more than three hydroxyl groups.

To prevent oxidative side-reactions the reaction is carried out in an inert gas atmosphere, e.g., nitrogen. If polymers are desired with a high molecular weight, the water content of the reaction mixture should not exceed a value of 0.5% by weight.

Some alkali metal salts of bisphenols and polyphenols can only be freed of adhering water with difficulty and it is therefore a problem to reduce the water content of the reaction mixture according to the described method to below 0.5% by weight; hence, it is preferable to prepare the alkali metal phenolates in situ by dissolving the bisphenol and the phenol with a higher valency than two in an apparatus, which is continually rinsed with nitrogen, in an amount of polar solvent sufficient for use in the subsequent reaction, then by adding the stoichiometric amount of alkali metalhydroxide in solid form or in aqueous solution, heating the mixture for some time, e.g., 4 to 8 hours to about 120°C to about 160°C and by distilling off the water which is contained in the system. To achieve a quicker and complete removal of the water it is advantageous to add an auxiliary solvent, for example, benzene, toluene or chlorobenzene and to distill off the water azeotropically from the mixture by means of the auxiliary agent, optionally at reduced pressure.

To the cooled solution of the phenolates in the polar solvent there is added an amount of dihalogenaryl sulphone which is equimolecular to the amount of bisphenolate and which is optionally dissolved in the same solvent. The actual condensation reaction then proceeds for example by heating this mixture for 3 to 8 hours to reaction temperatures between 100° and 160°C. It is possible, if required, to regulate or restrict the molecular weight during or towards the end of the reaction. This is effected by adding at 90° to 100°C in a predetermined amount as a chain breaking agent a solution of an alkyl halogenide, e.g., methyl chloride, methyl bromide or another similarly effective substance dissolved in a small amount of the polar solvent used in the reaction. The concentration of the chain breaking agent depends on the molecular weight and degree of branching desired.

The alkali metal halogenide which forms during the condensation reaction precipitates as a finely crystalline salt and following completion of the reaction can be separated by filtration in a simple manner from the polymer solution. After cooling this is mixed with either water or a lower alcohol, such as methanol or ethanol, whereupon polyaryl-ether sulphone precipitates in solid form. It is separated off and washed with water to remove the remainder of the salt and the solvent.

It is not absolutely necessary that the auxiliary solvent used be quantitatively removed from the reaction mixture. To obtain aromatic polyaryl-ether sulphones with a high molecular weight the auxiliary solvent should be used in an amount which does not permit precipitation of the initial polymer substance or of already formed polymer substance in the hot reaction mixture. This should be the case at amounts between 1 vol % and 15 vol % based on the total amount of solvent.

To prepare the aromatic polyaryl-ether sulphones, mixtures of the named bis-(4-halogenaryl)-sulphones can also be used. In addition, it is possible to react mixtures of 2 or more aromatic dialkali metal bishydroxylates with the named bis-(4-halogenaryl)-sulphones and to use as well two or more of the above-specified branching components for the synthesis of the aromatic polyaryl-ether sulphones in accordance with the invention.

A further prerequisite for the preparation of the aromatic polyaryl-ether sulphones with a high molecular weight is the use of equimolecular amounts of the bifunctional starting substances. Although the formation of aromatic polyaryl-ether sulphones of sufficiently high molecular weight is not prevented in every case due to an excess of the one or other component, the deviation of the amount of the bis-(4-halogenaryl) compounds with sulphonyl groups between the aryl nuclei and of the aromatic dialkali metal bishydroxylates from the equivalence should not be more than 0.5 mol %.

The branched aromatic polyaryl-ether sulphones of the invention have divalent structural elements of the formula IV

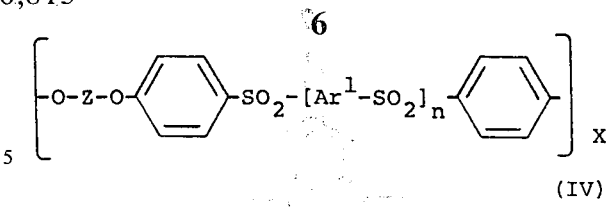

wherein $Ar^1$ has the above-given meaning, $n$ is 0 or 1, Z corresponds to a p-phenylene radical, m-phenylene radical or divalent radical of the following formula V

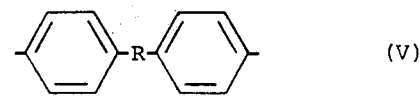

wherein R has the above meaning and X can be an integer between about 10 and about 120. The branched aromatic polyaryl-ether sulphones according to the invention also contain in amounts of between 0.01 mol % and 2 mol %, based on the starting bishydroxylate or bishalogenaryl compound, of trishydroxylate residues or hydroxylate residues, which result from the incorporated branching components and which have more than three hydroxylate groups and/or trivalent or more than trivalent aryl branching residues resulting from the halogenaryl compounds which carry three or more than three aryl-linked halogen substituents capable of substitution under the reaction conditions of the polyaryl-ether sulphone preparation.

As hydroxylate branching radicals or aryl branching radicals there may be mentioned the following preferred trivalent or more than trivalent radicals derived from the branching components named by way of example above:

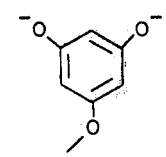

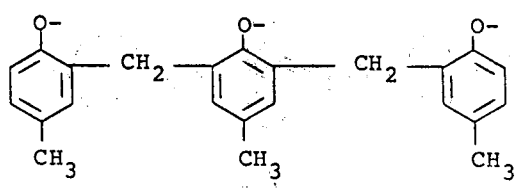

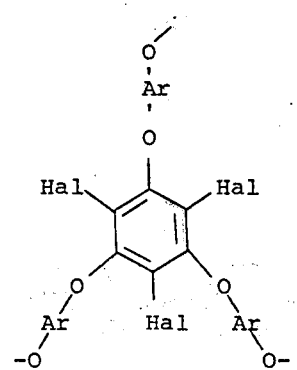

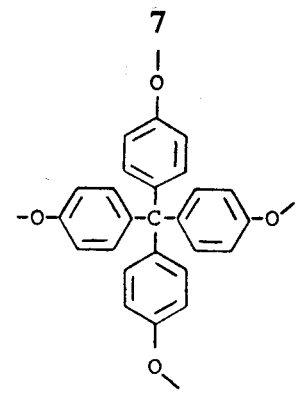

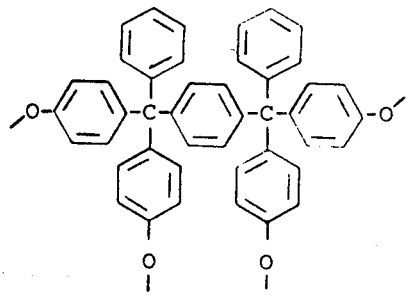

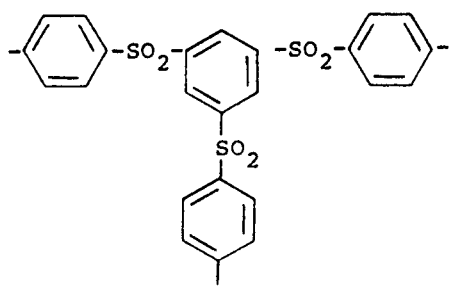

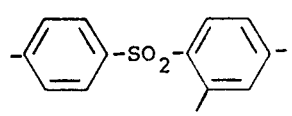

The definitions of the symbols Hal and Ar which appear in these formulae correspond to that for formula III (above).

Moldings and foils from the polyaryl-ether sulphones of the invention show good resistance to acid or basic hydrolysis. Furthermore they exhibit good mechanical properties and dimensional stability over a wide range. Particularly remarkable is their greatly reduced susceptibility to stress cracking as solid bodies and foils and their resistance to polyester resins on the basis of unsaturated polyester and co-polymerizable monomers (UP resins) as well as their reduced inflammability.

The solubility of the polyaryl-ether sulphones according to the invention in conventional solvents, for example in methylene chloride, chloroform, is good, that is over 15 g of polyaryl-ether sulphone can be dissolved per 100 g of solvent at room temperature and cast to form films.

EXAMPLES

EXAMPLE 1

Branched polysulphone with a trisphenol additive of 1 mol %

57.075 g (0.25 mol) of 2,2-bis-(4-hydroxyphenyl)-propane and 0.871 g (0.0025 mol) of 2,6-bis-(2'-hydroxy-5'-methylbenzyl)-4-methyl-phenol are weighed and put into a metal container and dissolved in 500 ml of dimethyl sulphoxide. The container is provided with a gas inlet pipe, a stirrer, a thermometer, a reflux condenser and a water collecting device filled with toluene. A slow nitrogen stream is then conducted through the apparatus in order to produce an inert gas atmosphere. 20.03 g (0.5 + 0.0075 mol) of sodium hydroxide are added in solid form or as a concentrated aqueous solution and 150 ml of toluene added dropwise after the sodium hydroxide has dissolved. The resulting reaction mixture is heated for 6 hours to a temperature of 140° to 150°C. During this time the water contained in the reaction mixture and being produced during the formation of phenolate is continuously distilled with the toluene as an azeotrope into the water collecting device and precipitates there, while the toluene recycles to the reaction mixture. When all the water is removed from the reaction system, the water collecting vessel is emptied, the toluene distilled off and a solution of 72.882 g (0.25 + 0.00375 mol) of 4,4'-dichlorodiphenyl sulphone in 100 ml of anhydrous dimethyl sulphoxide is added at a temperature of 120° to 140°C. While stirring, the reaction mixture is gradually heated to a reaction temperature of 150°C. It is then left at this temperature for 6 hours, the sodium chloride forming during condensation rapidly separating off. After completion of the reaction the cooled polymer solution is introduced into rapidly stirred water, the resultant polyaryl-ether sulphone separating off in solid form. It is filtered by means of suction, carefully washed and dried in vacuo. For purification the resulting polysulphone is dissolved in methylene chloride, filtered and poured into an excess of rapidly stirred methanol. The polysulphone thereupon precipitates as white flakes. It is then filtered by suction and dried.

EXAMPLE 2

Branched polysulphone with 1 mol % of 1,3,5-tris-(4-chlorophenyl sulphonyl)-benzene In a reaction analogous with Example 1, 47.075 g = 0.25 mol of 2,2-bis-(4-hydroxyphenyl)-propane are reacted to form alkali metal bisphenolate and after dehydration the reaction to form polymers is brought to an end with 71.8 g = 0.25 mol of 4,4'-dichlorodiphenyl-sulphone and 1.503 = 0.0025 mol of 1,3,5-tris-(4-chlorophenyl-sulfonyl)-benzene. Working up is carried out according to Example 1.

EXAMPLE 3

Branched polysulphone with a trisphenol additive of 0.5 mol %

57.075 g (0.25 mol) of 2,2-bis-(4-hydroxyphenyl)-propane and 0.4355 g (0.00125 mol) of 2,6-bis-(2'-hydroxy-5'-methyl-benzyl)-4-methylphenol are weighed and put into a metal container and dissolved in 500 ml of dimethyl sulphoxide. The container is provided with a gas inlet pipe, a stirrer, a thermometer, a reflux condenser and with a water collecting device filled with toluene. A slow nitrogen stream is then conducted through the apparatus in order to produce an inert gas atmosphere. 2.0015 g (0.5 + 0.00375 mol) of sodium hydroxide are added in solid form or as a concentrated aqueous solution and 150 ml of toluene added dropwise after the sodium hydroxide has dissolved. The resulting mixture is heated for 6 hours to a temperature of 140° to 150°C. During this time the water contained in the reaction mixture and the water being produced during the formation of phenolate is distilled with the toluene into the water collecting device where it precipitates, while the toluene recycles to the reaction vessel. After removal of the water from the reaction system the water collecting device is emptied, the toluene distilled off and a solution of 72.332 g (0.25 + 0.001875 mol) of 4,4'-dichloro-diphenylsulphone in 100 ml of anhydrous dimethylsulphoxide is added at a temperature of 120° to 140°C. The reaction mixture is then heated while stirring to 150°C. It is then left at this temperature for 6 hours. After completion of the reaction the resulting product is worked up as in Example 1.

EXAMPLE 4

Branched polysulphone with a trisphenol additive of 1 mol %

In a reaction, which is carried out under the same reaction conditions as described in Example 1, the same reactants are reacted with one another as in Example 1 with the exception that the 4,4'-dichlorodiphenyl-sulphone is not used as the sulphone partner, but instead 4,4'-bis-(4-chlorophenyl-sulphone)-diphenyl in an amount of 127.327 g (0.25 + 0.00375 mol).

EXAMPLE 5

Branched polysulphone with a trisphenol additive of 1 mol %

In a reaction, which is carried out under the same conditions as in Example 1, the same reactants as in Example 1 are reacted with one another except that 2,6-bis-(2'-hydroxy-5'-methylbenzyl)-4-methylphenol is not used as the branching agent, but 1,3,5-tris-(4-hydroxy-phenoxy)-2,4,6-trichlorobenzene in an amount of 1.27 g (0.025 mol).

EXAMPLE 6

Branched polysulphone with a trisphenol additive of 1 mol %

In a reaction, which is carried out under the same conditions as in Example 1, the same reactants as in Example 1 are reacted with one another except that 2,6-bis-(2'-hydroxy-5'-methylbenzyl)-4-methyl-phenyl is not used as a branching agent, but instead 1,3,5-tris-[4-(4-hydroxyphenyl-isopropyl)-phenoxy]-2,4,6-trichlorobenzene in an amount of 2.1 g (0.025 mol).

EXAMPLE 7

Branched polysulphone with a trisphenol additive of 1.5 mol %

In a reaction, which is carried out under the same conditions as in Example 3, the same reactants are reacted with one another as in Example 1 (molar amounts of the reactants 0.25 mol, 0.00375 mol and 0.25 + 0.005675 mol) with the exception that 6 g of methyl chloride as a chain breaking agent are added to the still hot polymer solution after the reaction solution has been heated to 150°C for 4 hours.

The following results of the experiments show how the novel branched polyaryl-ether sulphones differ from the previously known linear polyaryl-ether sulphones. For this purpose linear unbranched polyaryl-ether sulphones of the formulae

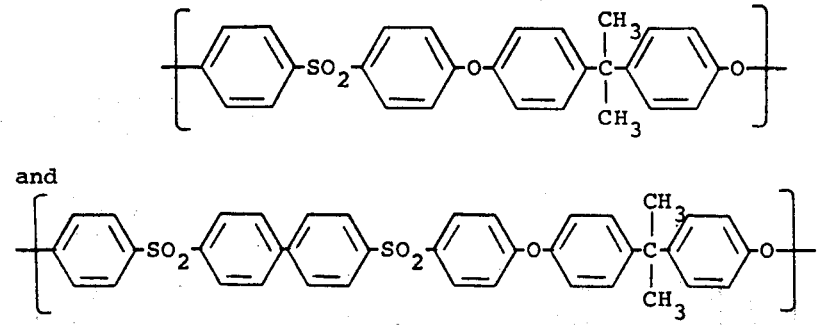

and (termed in the following as polysulphone A and polysulphone B) are produced according to the same methods as described in Examples 1 to 7 but with ommission of the branching components and compared with the corresponding branched polyaryl-ether sulphones.

Table 1 shows the stress cracking behavior and the burning behavior of the branched polysulphones prepared in Examples 1 to 7.

Table 1

| Example | $\eta_{rel}$ | $M_{LS}$ | Stress[+] cracking behavior | Burning behavior[++] Dripping tendency | Afterburning time in sec. |
|---|---|---|---|---|---|
| 1 | 1.265 | 63000 | + | does not drip | 2 |
| 2 | 1.265 | 63000 | ++ | " | 8 |
| 3 | 1.240 | 58000 | + | " | 9 |
| 4 | 1.281 | 66000 | + | " | |
| 5 | 1.207 | 34000 | + | " | 5 |
| 6 | 1.290 | 69000 | + | " | 11 |
| 7 | 1.225 | 68000 | + | " | |
| Poly-[1] sulphone | A 1.18 B 1.19 | 38000 18000 | − — | drips " | 20 |

+good
++very good
−bad
—very bad

[1]Linear polyaryl sulphone ether, produced according to NE 6408130
[+]storage in ethylacetate (10 seconds, tensile strength 15 kp/cm²).
[++]strips of 150 × 10 mm were cut from foil with a thickness of 70 to 80 μ and folded lengthwise in the middle to form an angle of about 90°C. The ends of the foil were held in a Bunsen burner flame for about 3 seconds (4 cm high, just lighted) and the afterburning period measured as well as their tendency to drip while burning.

EXAMPLE 8

Branched polysulphone with tetra-(4-hydroxyphenyl)-methane as a branching agent 114.15 g ≙ 0.5 mol of 2,2-bis-(4-hydroxyphenyl)-propane and 1.9 g ≙ 0.005 mol of tetra-(4-hydroxyphenyl)-methane are weighed and put into a metal container and dissolved in 1000 ml of dimethyl sulphoxide. The container is provided with a gas inlet pipe, stirrer, thermometer, reflux condenser, and with a water collecting device filled with toluene. A slow nitrogen stream is then conducted through the apparatus in order to produce an inert gas atmosphere. 40.8 g ≙ 1 + 0.02 mol of sodium hydroxide are added in solid form and 150 ml of toluene added dropwise after the sodium hydroxide has dissolved. The reaction mixture thus obtained is heated for 6 hours to a temperature of 140° to 150°C. During this time the water contained in the reaction mixture and being produced during the formation of phenolate is removed from the cycle together with toluene. After removal of the water from the reaction system the toluene is distilled off and 143.6 g ≙ 0.5 + 0.0025 mol of 4,4'-dichlorodiphenyl sulphone added at a temperature of 100° to 120°C. The mixture is then heated for 6 hours to 150° to 155°C while stirring, the NaCl forming during condensation rapidly precipitating. After completion of the reaction the resultant product is worked up as in Example 1.

Table 2 shows the different products branched with tetra-(4-hydroxyphenyl)-methane, their relative viscosity (measured against a polymer solution of 0.5 g in 100 ml of methylene chloride at 25°C), their osmotic molecular weight and their degree of branching.

Table 2

| Example 8 | $\eta_{rel}$ | $M_{os}$ | mol % branching agent |
|---|---|---|---|
| a | 1.252 | 18.700 | 0 |
| b | 1.262 | 19.800 | 0.2 |
| c | 1.454 | 43.600 | 0.5 |
| d | 1.651 | 85.000 | 1.0 |
| e | 1.184 | 22.000 | 0.35 |
| PSO[1] | 1.210 | 23.000 | 0 |

PSO[1] linear polysulphone according to NE 64 08 130 (commercial product).

Table 3 below shows the stress cracking behavior with reference to the tensile strength and elongation prior to and after storage in a solvent mixture or with reference to the resistance to unsaturated polyester resins:

Table 3

| Example 8 | 10 sec. storage in toluene/n-propanol | | | | Resistance to Leguval[++] W 41/F 30 |
|---|---|---|---|---|---|
| | 1:3 | | 1:3.5 | | |
| | Ten.Str. %[+] | Elong. %[+] | Ten.Str. %[+] | Elong. %[+] | |
| a | 50 | 60 | 45 | 60 | not resistant |
| b | 58 | 60 | 60 | 60 | resistant to a limited degree |
| c | 93.5 | 80 | 84 | 80 | resistant |
| d | 100 | 100 | 100 | 100 | " |
| e | 70 | 80 | 66 | 60 | " |
| PSO[1] | 40 | 45 | 40 | 50 | not resistant |

[1]linear polysulphone according to NE 6 408 130 (commercial product)
[+]data expressed as a percentage of the initial value
[++]Leguval W 41/F 30 (commercial product of BAYER AG). Leguval resins are unsaturated polyester resins (cast resins). They are obtained by esterification of unsaturated dicarboxylic acids (maleic acid, fumaric acid and the like) with bivalent alcohols (e.g. glycol, 1,2-propanediol, 1,3-butanediol inter alia) in a molecular ratio. The unsaturated acids can be partly replaced by saturated acids. After they have been dissolved, usually in styrene, these unsaturated polyesters yield cast resins, which are cured by catalysts such as peroxides and then result in cross-linked mixed copolymers.

What is claimed is:

1. A branched, high-molecular weight, thermoplastic polyaryl-ether sulphone consisting essentially of bivalent structural elements of the formula

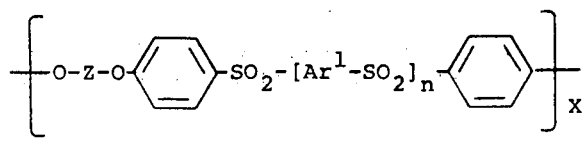

where
Ar¹ is a biphenylene radical or an oxybiphenylene radical,
n is 0 or 1,
Z is a p-phenylene radical, an m-phenylene radical or a bivalent radical of the formula V

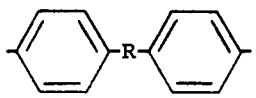

where
R is a bivalent $C_1$–$C_{12}$ alkylene or alkylidene radical, a $C_3$–$C_{12}$ cycloalkylene or cycloalkylidene radical, a $C_7$–$C_{12}$ aralkylene or aralkylidene radical or a $C_8$–$C_{12}$ arylene-bisalkylidene radical or the group —O—, —S—, —SO—, —SO₂—, —CO— or a simple bond and wherein
X is an integer between about 10 and 120,
and trivalent structural elements derived from an aromatic compound having at least three aromatically linked alkali metal hydroxylate substituents and/or from a halogenaryl compound having at least three aryl-linked halogen substituents, said halogenaryl compound containing an electron-attracting group; and which is the condensation reaction product of approximately equimolar amounts of an aromatic dialkali metal bishydroxylate and a bis-(4-halogenaryl) compound, whose aryl nuclei are linked by sulphonyl groups, and about 0.01 to about 2 mol %, based on the bishydroxylate or bis-(4-halogenaryl) compound, of an aromatic compound having at least three aromatically linked alkali metal hydroxylate substitutents and/or of a halogenaryl compound having at least three aryl-linked halogen substitutents, said halogenaryl compound containing an electron-attracting group.

2. The branched, high-molecular weight polyarylether sulphone of claim 1, wherein the aromatic compound having at least three aromatically linked alkali metal hydroxylate substituents is the alkali metal salt of 2,6-bis-(2'-hydroxy-5'-methylbenzyl)-4-methyl-phenol; 1,4-bis-[(4,4'-dihydroxy-triphenyl)-methyl]-benzene or tetra-(4-hydroxyphenyl)-methane.

3. The branched, high-molecular weight polyarylether sulphone of claim 1, wherein the halogenaryl compound is 1,3,5-tris-(4-chlorophenyl-sulphonyl)-benzene.

4. The branched, high-molecular weight polyarylether sulphone of claim 1 having a molecular weight, measured by means of light diffusion, of from about 20,000 to about 120,000.

5. The branched, high-molecular weight polyarylether sulphone of claim 1 which is the reaction product of the approximately equimolar amounts of the aromatic dialkali metal bishydroxylate and the bis-(4-halogenaryl) compound, and about 0.05 to about 1.5 mol % of the aromatic compound having at least three aromatically linked alkali metal hydroxylate substituents and/or the halogenaryl compound.

6. The branched, high-molecular weight polyarylether sulphone of claim 1 comprising, in addition, monovalent residues derived from a $C_1$–$C_4$ monoalkyl halogenide and/or a monophenol.

* * * * *